Figure 1:
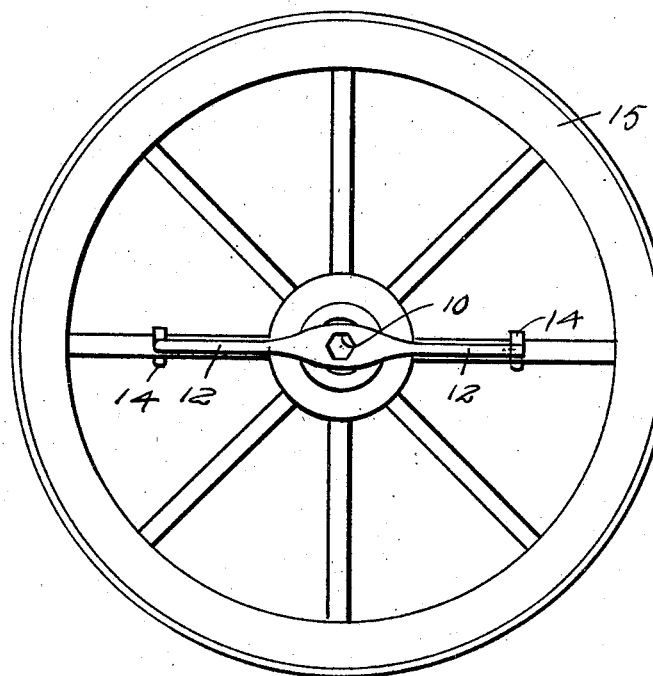

Oct. 16, 1923.

L. D. PHILLIPS

WRENCH

Filed Oct. 4, 1920

1,471,200

Inventor
L. D. Phillips

Patented Oct. 16, 1923.

1,471,200

UNITED STATES PATENT OFFICE.

LEONARD D. PHILLIPS, OF EAGLE POINT, WISCONSIN.

WRENCH.

Application filed October 4, 1920. Serial No. 414,503.

*To all whom it may concern:*

Be it known that I, LEONARD D. PHILLIPS, a citizen of the United States, residing at Eagle Point, in the county of Chippewa and State of Wisconsin, have invented certain new and useful Improvements in Wrenches; and I do hereby declare the following to be a full, clear, and exact description of the invention, such as will enable others skilled in the art to which it appertains to make and use the same.

Figure 2:
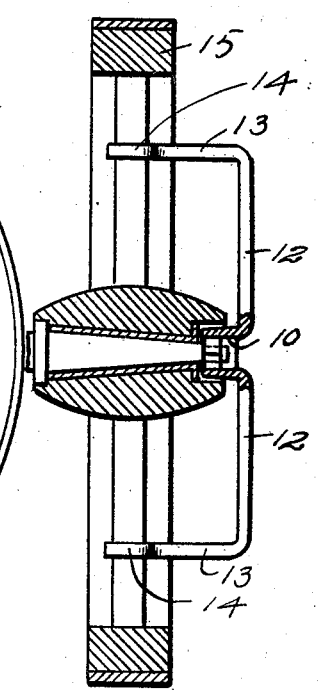
Figure 3:
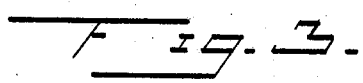

The object of the invention is to provide a simple, inexpensive and efficient device by which the removal and replacement of the vehicle wheels may be facilitated, and more especially whereby the axle nuts of such wheels may be disengaged from the axle spindles and held during the removal of a wheel for the purpose of applying grease to the axle or making any like arrangement and then returning the nut to its place in engagement with the spindle without necessitating the manual handling or touching of the nut; and with these objects in view the invention consists in a construction and combination of parts of which a preferred embodiment is shown in the drawing wherein;

Figure 1 is a view of a wrench embodying the invention applied in the operative position to a wheel shown in elevation, Figure 2 is an edge or side view of the wrench indicating the same in applied relation to the wheel, the latter being shown in section, Figure 3 is a detail view of the wrench detached.

The device consists essentially of a nut seat or socket 10, of cross sectionally angular or irregular form adapted in size and shape to receive and engage an axle nut such as that indicated at 11, from which socket extend radially the arms 12 of yielding or spring construction and material, having terminal fingers 13 of which the extremities are provided with spoke engaging claws or hooks 14.

In applying the wrench to a wheel such as that indicated at 15 in the drawings, the socket should be fitted upon the axle nut and then the arms should be sprung or pressed in opposition to the spring resistance thereof until the claws, or hooks 14 at the extremities of the fingers 13 can be engaged with opposite spokes of the wheel, whereupon by turning the wheel in the proper direction the wrench being carried therewith will unscrew the nut and permit of the removal of the wheel from the spindle, the nut being held by the socket and thus prevented from dropping or being exposed to dust or grit such as would be involved in the ordinary practice in temporarily placing the nut on the ground or on a support such as a convenient part of the vehicle pending the necessity of replacing the same upon the axle spindle. When the axle spindle has been greased or cleaned, or other necessary operation has been performed thereon, the wheel may again be fitted upon the spindle and the act of so positioning the wheel likewise positions the nut which in the meantime has been held by the wrench, so that the turning movement of the wheel in the opposite direction will again screw the nut upon the threaded portion of the spindle and lock the wheel in place.

Thus the wheel may be removed and replaced without necessitating the personal or manual handling of the nut and the soiling of the fingers incident thereto, and as above indicated the nut is held in proper position for replacement and is protected against accumulations of dust or other foreign matter, the resilience of the arms 12 serving to firmly hold the wrench in its proper relation to the wheel during this operation.

Obviously the terminal claws or hooks on the fingers at the ends of the radial arms may readily be disengaged from the spokes of the wheels by a rearward pressure upon said arms after the parts have been returned to their normal or operative position.

What is claimed is:—

A one-piece wrench having alined arms, a nut-receiving socket member connecting and being inwardly offset relatively to the arms, fingers extending inwardly substantially at a right angle from the arms and terminating beyond the socket member in hooks adapted for clasping engagement with wheel spokes, said hooks having their longitudinal median line at a right angle to the fingers so that the hooks will engage the spokes at the front and rear thereof to resist displacing movement of the socket member from an engaged nut, and said hooks being open at the same side of the wrench.

In testimony whereof I affix my signature in the presence of two witnesses.

LEONARD D. PHILLIPS.

Witnesses:
 KATIE HAYES,
 HENRY LEBEIS, JR.